United States Patent
Altman et al.

(10) Patent No.: US 11,941,626 B2
(45) Date of Patent: Mar. 26, 2024

(54) SYSTEM AND METHOD FOR ASSOCIATING A CRYPTOCURRENCY ADDRESS TO A USER

(71) Applicant: VERINT SYSTEMS LTD., Herzliya Pituach (IL)

(72) Inventors: Yuval Altman, Herzliya Pituach (IL); Yitshak Yishay, Revava (IL); Yaron Gvili, Kefar Saba (IL); Hodaya Shabtay, Bnei Brak (IL)

(73) Assignee: COGNYTE TECHNOLOGIES ISRAEL LTD. (IL)

( * ) Notice: Subject to any disclaimer, the term of this patent is extended or adjusted under 35 U.S.C. 154(b) by 378 days.

(21) Appl. No.: 17/179,770

(22) Filed: Feb. 19, 2021

(65) Prior Publication Data

US 2021/0264421 A1 Aug. 26, 2021

(30) Foreign Application Priority Data

Feb. 23, 2020 (IL) .......................................... 272861

(51) Int. Cl.
*G06Q 20/40* (2012.01)
*G06Q 20/36* (2012.01)
*H04L 9/40* (2022.01)

(52) U.S. Cl.
CPC ....... *G06Q 20/401* (2013.01); *G06Q 20/3674* (2013.01); *G06Q 2220/00* (2013.01); *H04L 63/0428* (2013.01); *H04L 63/1408* (2013.01)

(58) Field of Classification Search
None
See application file for complete search history.

(56) References Cited

U.S. PATENT DOCUMENTS

| | | | | |
|---|---|---|---|---|
| 10,264,050 B2* | 4/2019 | Todasco | ................ | H04L 65/612 |
| 10,999,295 B2* | 5/2021 | Gil | ......... | H04L 9/0637 |
| 11,444,956 B2* | 9/2022 | Gil | ....... | H04L 63/1408 |
| 2008/0214300 A1* | 9/2008 | Williams | ............ | H04L 63/0428 463/29 |
| 2013/0073859 A1* | 3/2013 | Carlson | ................ | H04L 9/3247 713/176 |

(Continued)

FOREIGN PATENT DOCUMENTS

| | | | | |
|---|---|---|---|---|
| CN | 108027867 A | * | 5/2018 | ......... G06F 12/1408 |
| CN | 110945548 A | * | 3/2020 | ......... G06F 16/2255 |

(Continued)

OTHER PUBLICATIONS

A. A. Monrat, O. Schelén and K. Andersson, "A Survey of Blockchain From the Perspectives of Applications, Challenges, and Opportunities," in IEEE Access, vol. 7, pp. 117134-117151, 2019, https://ieeexplore.ieee.org/document/8805074?source=IQplus (Year: 2019).*

(Continued)

*Primary Examiner* — El Mehdi Oussir
(74) *Attorney, Agent, or Firm* — ISUS INTELLECTUAL PROPERTY PLLC; Anthony Jason Mirabito (57) ABSTRACT

A system and method in which one or more probing transactions are performed by transferring respective amounts of a cryptocurrency to one or more cryptocurrency addresses. The system then monitors and ascertains communications traffic exchanged with one or more IP addresses and that at least one of the probing transactions was downloaded to a particular IP address. The system then generates an output that can indicate an association between a cryptocurrency address of interest and the particular IP address.

9 Claims, 4 Drawing Sheets

(56) References Cited

U.S. PATENT DOCUMENTS

| | | | |
|---|---|---|---|
| 2016/0099857 A1* | 4/2016 | Begwani | H04L 43/20 |
| | | | 370/252 |
| 2017/0124535 A1 | 5/2017 | Juels et al. | |
| 2018/0053182 A1 | 2/2018 | Mokhasi | |
| 2018/0109542 A1* | 4/2018 | Katzir | G06N 20/00 |
| 2019/0364057 A1* | 11/2019 | Hazay | H04L 63/1416 |
| 2019/0386969 A1* | 12/2019 | Verzun | G06F 21/606 |
| 2020/0111066 A1* | 4/2020 | Anstey | H04L 67/104 |
| 2020/0311736 A1* | 10/2020 | Song | G06Q 20/4016 |
| 2021/0105249 A1* | 4/2021 | Bajaria | H04L 67/535 |
| 2023/0033600 A1* | 2/2023 | Nelson | H04L 9/3236 |
| 2023/0214925 A1* | 7/2023 | Cella | G06Q 20/367 |
| | | | 705/37 |

FOREIGN PATENT DOCUMENTS

| | | | | |
|---|---|---|---|---|
| CN | 111712845 A | * | 9/2020 | G06Q 20/065 |
| DE | 202018102306 U1 | * | 10/2018 | |
| JP | 2010182287 A | * | 8/2010 | |
| KR | 20080066676 A | * | 9/2006 | |
| WO | WO-2010104834 A2 | * | 9/2010 | G06F 17/30035 |
| WO | WO-2020106638 A1 | * | 5/2020 | G06F 16/955 |

OTHER PUBLICATIONS

Brotsis et al., Blockchain Solutions for Forensic Evidence Preservation in IoT Environments. https://arxiv.org/abs/1903.10770 (Year: 2019).*

F. Kfoury, J. Gomez, J. Crichigno, E. Bou-Harb and D. Khoury, "Decentralized Distribution of PCP Mappings Over Blockchain for End-to-End Secure Direct Communications," in IEEE Access, vol. 7, pp. 110159-110173. https://ieeexplore.ieee.org/document/8792050?source=IQplus (Year: 2019).*

Extended Search Report—corresponding European Application No. 21158526, dated Nov. 11, 2021, 5 pages.

* cited by examiner

SYSTEM AND METHOD FOR ASSOCIATING A CRYPTOCURRENCY ADDRESS TO A USER

FIELD OF THE DISCLOSURE

The present disclosure is related to communication over computer networks, particularly blockchain networks for cryptocurrency transactions.

BACKGROUND OF THE DISCLOSURE

U.S. Pat. No. 9,641,444 to Altman, whose disclosure is incorporated herein by reference, describes systems and methods for extracting user identifiers over encrypted communication traffic. An example method includes monitoring multiple flows of communication traffic. A sequence of messages is then sent to a user in accordance with a first temporal pattern. A flow whose activity has a second temporal pattern that matches the first pattern is then identified among the monitored flows. The identified flow is then associated with the user.

SUMMARY OF THE DISCLOSURE

There is provided, in accordance with some embodiments of the present disclosure, a system including a communication interface and a processor. The processor is configured to perform one or more probing transactions, in which respective amounts of a cryptocurrency are transferred to one or more cryptocurrency addresses, respectively. The processor is further configured to ascertain, by monitoring, via the communication interface, communication traffic exchanged with one or more Internet Protocol (IP) addresses, that at least one of the probing transactions was downloaded to a particular one of the IP addresses. The processor is further configured to generate an output indicating an association between a cryptocurrency address of interest and the particular one of the IP addresses, in response to the ascertaining.

In some embodiments, the cryptocurrency addresses include the cryptocurrency address of interest.

In some embodiments, the cryptocurrency addresses include a cryptocurrency address belonging to the same wallet as does the cryptocurrency address of interest.

In some embodiments, the processor is configured to ascertain that the at least one of the probing transactions was downloaded to the particular one of the IP addresses by:
ascertaining that a difference between (i) a download time of a downloading of a sequence of one or more encrypted packets to the particular one of the IP addresses and (ii) an upload time of an uploading of the at least one of the probing transactions is within a predefined range, and
in response to ascertaining that the difference is within the predefined range, ascertaining that the at least one of the probing transactions was downloaded to the particular one of the IP addresses by virtue of the sequence specifying the at least one of the probing transactions.

In some embodiments, the processor is configured to ascertain that the at least one of the probing transactions was downloaded to the particular one of the IP addresses by:
computing an expected download size of the at least one of the probing transactions,
ascertaining that a difference between (i) a download size of a sequence of one or more encrypted packets downloaded to the particular one of the IP addresses and (ii) the expected download size, is within a predefined range, and
in response to ascertaining that the difference is within the predefined range, ascertaining that the at least one of the probing transactions was downloaded to the particular one of the IP addresses by virtue of the sequence specifying the at least one of the probing transactions.

In some embodiments,
the sequence is a downloaded sequence,
the processor is configured to perform the at least one of the probing transactions by uploading an uploaded sequence specifying the at least one of the probing transactions, and
the processor is configured to compute the expected download size by applying a linear function to an upload size of the uploaded sequence.

In some embodiments, the processor is configured to ascertain that the at least one of the probing transactions was downloaded to the particular one of the IP addresses by:
using an encrypted-packet classifier, ascertaining that a sequence of one or more encrypted packets downloaded to the particular one of the IP addresses specifies a downloaded transaction in the cryptocurrency, and
in response to ascertaining that the sequence specifies the downloaded transaction, ascertaining that the at least one of the probing transactions was downloaded to the particular one of the IP addresses by virtue of the downloaded transaction being the at least one of the probing transactions.

In some embodiments, the processor is configured to ascertain that the at least one of the probing transactions was downloaded to the particular one of the IP addresses by:
ascertaining that the cryptocurrency address of interest uses a particular service,
ascertaining that a sequence of one or more encrypted packets downloaded to the particular one of the IP addresses was communicated from the service, and
in response to ascertaining that the cryptocurrency address of interest uses the service and that the sequence was communicated from the service, ascertaining that the at least one of the probing transactions was downloaded to the particular one of the IP addresses by virtue of the sequence specifying the at least one of the probing transactions.

In some embodiments, the processor is configured to perform the probing transactions such that each of the probing transactions includes at least three outputs.

In some embodiments, the processor is configured to perform the probing transactions such that each of the probing transactions includes at least two inputs.

In some embodiments, the processor is configured to perform the probing transactions by uploading a plurality of uploaded sequences of one or more packets specifying the probing transactions, respectively, each of the uploaded sequences including at least five bytes unrelated to any of the probing transactions.

In some embodiments, the processor is configured to ascertain that the at least one of the probing transactions was downloaded to the particular one of the IP addresses by:
subsequently to performing the at least one of the probing transactions, ascertaining that a first downloaded transaction in the cryptocurrency was downloaded to the particular one of the IP addresses and a second downloaded transaction in the cryptocurrency was downloaded to another one of the IP addresses, ascertaining that another one of the probing transactions, in which some of the cryptocurrency is transferred to one of the cryptocurrency addresses that is different from the cryptocurrency address of interest, was downloaded to the other one of the IP addresses, and in response to ascertaining that the other one of the probing transactions was downloaded to the other one of the IP addresses, ascertaining that the at least one of the probing transactions was downloaded to the particular one of the IP addresses, by virtue of the first downloaded transactions being the at least one of the probing transactions.

In some embodiments, the processor is configured to perform the probing transactions by performing a respective one or more of the probing transactions at each time in a sequence of transaction times, and the processor is configured to ascertain that the probing transactions were downloaded to the particular one of the IP addresses by:
identifying multiple spikes in download activity at the particular one of the IP addresses at respective spike times, and
ascertaining that each of respective differences between the spike times and the transaction times is within a predefined range.

There is further provided, in accordance with some embodiments of the present disclosure, a method, including performing one or more probing transactions, in which respective amounts of a cryptocurrency are transferred to one or more cryptocurrency addresses, respectively. The method further includes, by monitoring communication traffic exchanged with one or more Internet Protocol (IP) addresses, ascertaining that at least one of the probing transactions was downloaded to a particular one of the IP addresses. The method further includes, in response to the ascertaining, generating an output indicating an association between a cryptocurrency address of interest and the particular one of the IP addresses.

There is further provided, in accordance with some embodiments of the present disclosure, a computer software product including a tangible non-transitory computer-readable medium in which program instructions are stored. The instructions, when read by a processor, cause the processor to perform one or more probing transactions, in which respective amounts of a cryptocurrency are transferred to one or more cryptocurrency addresses, respectively. The instructions further cause the processor to ascertain, by monitoring communication traffic exchanged with one or more Internet Protocol (IP) addresses, that at least one of the probing transactions was downloaded to a particular one of the IP addresses. The instructions further cause the processor to generate an output indicating an association between a cryptocurrency address of interest and the particular one of the IP addresses, in response to the ascertaining.

The present disclosure will be more fully understood from the following detailed description of embodiments thereof, taken together with the drawings, in which:

DETAILED DESCRIPTION OF EMBODIMENTS

Introduction

Cryptocurrency transactions are generally performed over a type of peer-to-peer (P2P) blockchain network referred to herein as a "cryptocurrency network." In general, there are three types of nodes that may transact over a cryptocurrency network: full nodes, partial nodes, and external (or "controlling") nodes.

A full node is typically consistently online, implements a standard network protocol, downloads a full copy of the blockchain, and downloads the details for all new transactions. (For convenience, the act of downloading the details of a transaction is referred to hereinbelow simply as "downloading the transaction.")

In contrast to a full node, a partial node may not be consistently online, does not download a full copy of the blockchain, and downloads only those transactions relating to certain cryptocurrency addresses. An example of a partial node is a Simple Payment Verification (SPV) node in the Bitcoin network, which uses a method called Simple Payment Verification for transaction validation. An SPV node randomly generates a Bloom filter, which causes the node to download transactions relating to various random cryptocurrency addresses in addition to the address of the node.

In contrast to both full nodes and partial nodes, an external node does not implement a standard network protocol and does not technically belong to the cryptocurrency network. Rather, using a proprietary protocol, the node requests to broadcast transactions, and is notified of new transactions performed by other parties, via a service running a full node. Most cryptocurrency wallets are external nodes.

Overview

In many cases, financial regulators, cryptocurrency exchange service providers, or other parties may wish to identify the owner of a cryptocurrency address of interest, referred to herein as the "user of interest" (UOI). However, transaction details passed over cryptocurrency networks are typically anonymized, in that they include the respective cryptocurrency addresses of the transacting parties without including the IP addresses used by the parties or any other identifying information. Moreover, identifying the UOI may be particularly difficult in the event that the UOI uses an external node to transact, given that communication between an external node and the service used by the node is typically encrypted.

To address this challenge, Israel Patent Application No. 265505, whose disclosure is incorporated herein by reference, provides a system and method for monitoring the encrypted traffic exchanged between various IP addresses and a cryptocurrency network. Portions of the encrypted traffic are labeled as performed cryptocurrency transactions. In addition, transaction details specifying the cryptocurrency address of interest are downloaded from the network. By correlating between the times at which the transactions are performed (per the encrypted traffic) and the times at which the transaction details are received, the "IP address of interest," which is associated with the cryptocurrency address of interest, may be identified.

However, while useful in many cases, the aforementioned technique requires that subsequently to the identification of the cryptocurrency address of interest, the UOI continue to transact using the same cryptocurrency address, or at least the same wallet. In view of this limitation, embodiments of the present disclosure provide active de-anonymization techniques, which may be performed alternatively or additionally to the aforementioned passive technique. Advantageously, these active techniques are less dependent on the behavior of the UOI.

More specifically, per the active de-anonymization techniques described herein, a probing system performs one or more probing transactions. In each of these transactions, some cryptocurrency is sent to the cryptocurrency address of interest or to another cryptocurrency address belonging to the same wallet. While the probing transactions are performed, the traffic exchanged between the cryptocurrency network and various Internet Protocol (IP) addresses is monitored. In addition, downloads of transactions are identified in the monitored traffic, using machine-learned techniques (or any other suitable techniques) to identify those of the downloads that are encrypted. By correlating between the times of the identified downloads and the times at which the probing transactions are performed, the IP address used by the UOI, referred to herein as the "IP address of interest," is inferred. Subsequently, the IP address may be used to identify the UOI, e.g., by identifying an International Mobile Subscriber Identity (IMSI), a Mobile Station International Subscriber Directory Number (MSISDN), or any other identifier associated with the IP address.

For example, subsequently to identifying a cryptocurrency address of interest, a probing transaction specifying this address as the destination address may be performed. Subsequently, by processing the monitored traffic, potential downloads of the probing transaction to the IP address of interest may be identified. These "candidate" downloads may include any unencrypted downloads specifying the probing transaction, along with any encrypted downloads satisfying certain criteria. Such criteria may include, for example, that the download follows the probing transaction by an amount of time that falls within a predefined range, and/or that the size of the downloaded transaction corresponds to the size of the probing transaction. (In this context, the "size" of a transaction refers to the size of the sequence of packets containing details of the transaction.)

If only one candidate corresponding transaction download is identified, this download may be assumed to have been performed by a device belonging to the UOI. Hence, the IP address to which the transaction was downloaded may be identified as the IP address of interest.

On the other hand, if more than one candidate corresponding download is identified—indicating that at least one other device may have coincidentally downloaded a similarly-sized transaction at around the same time as a device belonging to the UOI downloaded the probing transaction—the respective IP addresses to which the downloads were performed may be identified as candidate associated IP addresses. Subsequently, one or more additional probing transactions, each specifying the cryptocurrency address of interest as the destination address, may be performed, until only a single candidate remains.

In some embodiments, the size of each probing transaction is made unusually large. For example, an increased number of inputs and/or outputs (i.e., destination addresses) may be included in the transaction, and/or extra random bytes may be added to the transaction. The large size of the transaction reduces the number of candidate corresponding downloads, and hence facilitates identifying the IP address of interest with fewer probing transactions.

Alternatively or additionally, to reduce the number of candidate corresponding downloads, it may be inferred, based on the properties of at least one transaction involving the cryptocurrency address of interest, that the cryptocurrency address of interest belongs to a custodial or non-custodial wallet that uses a particular service, such as Mycellium™ or Coinbase™. In response thereto, transaction downloads that are not performed via the particular service may be assumed not to correspond to the probing transaction.

In some cases, one or more partial nodes not belonging to the UOI may download every transaction in which the cryptocurrency address of interest is specified as the destination. In such cases, even a large number of probing transactions to the cryptocurrency address of interest may be insufficient to identify the IP address of interest.

Hence, in the event that multiple candidate associated IP addresses are identified following the initial probing transaction to the cryptocurrency address of interest, an alternative technique may be performed. Per this alternative technique, the probing system performs another probing transaction specifying, as the destination, another cryptocurrency address belonging to the same wallet as does the cryptocurrency address of interest. Subsequently, the IP address to which both the original probing transaction and the additional probing transaction are downloaded may be identified as the IP address of interest.

Typically, the size of any downloaded sequence of packets containing a transaction is a linear function of the size of the uploaded sequence of packets that contained the transaction, the parameters of this linear function generally varying between the various services used for downloading transactions. In some embodiments of the present disclosure, this linear function is learned for different respective services used by customers to transact. Subsequently, this information is used to facilitate identifying the candidate corresponding downloads for any particular probing transaction.

System Description

Figure 1:
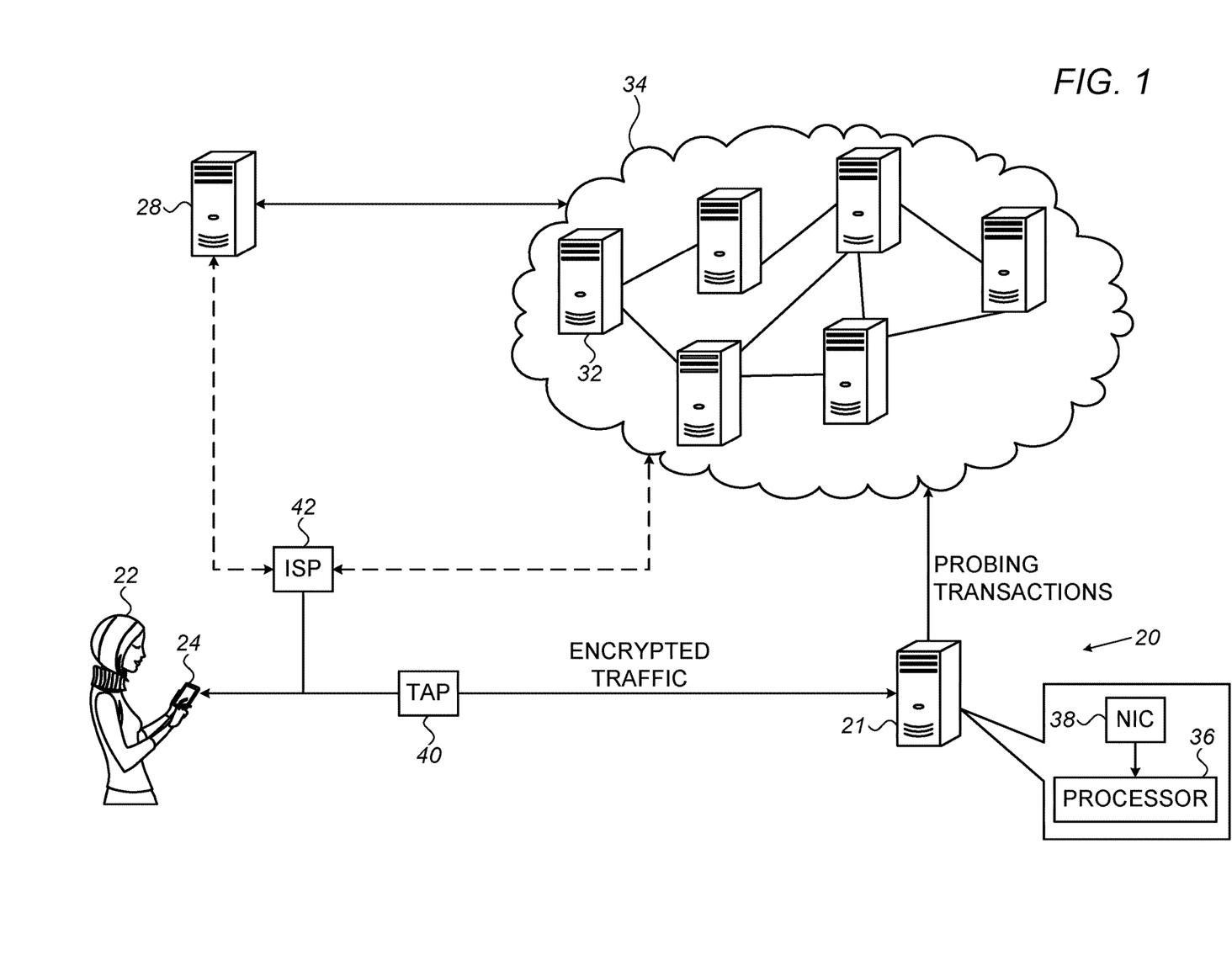
FIG. 1 is a schematic illustration of a system for identifying an Internet Protocol (IP) address associated with a cryptocurrency address of interest, in accordance with some embodiments of the present disclosure.

Reference is initially made to FIG. 1, which is a schematic illustration of a system 20 for identifying an IP address associated with a cryptocurrency address of interest, in accordance with some embodiments of the present disclosure.

FIG. 1 depicts a blockchain network 34, which includes a plurality of full nodes 32. Transactions in Bitcoin, Litecoin, Ethereum, or any other cryptocurrency may be performed over network 34 and handled (e.g., validated) by full nodes 32. FIG. 1 further depicts a user 22 using a device 24, such as a smartphone, to perform cryptocurrency transactions over network 34 via an Internet Service Provider (ISP) 42.

For example, for each transaction in which some cryptocurrency is transferred to the user's cryptocurrency wallet, device 24 may download a sequence of one or more packets specifying the transaction.

In some cases, the cryptocurrency wallet belonging to user 22 is managed by a service, such as Mycellium™ or Coinbase™, running on a cloud server 28. As transactions involving the user's wallet are performed, device 24 exchanges traffic with network 34 via server 28. In such cases, traffic between the device and the server is typically encrypted.

In other cases, the cryptocurrency wallet belonging to user 22 implements the functionality of a partial node, such that device 24 may exchange traffic with network 34 directly, without using a server.

System 20 comprises a server 21, comprising a processor 36 and a communication interface 38, such as a network interface controller (NIC) or another network interface. Via communication interface 38, processor 36 performs probing transactions over network 34, as further described below with reference to FIG. 2. While the probing transactions are performed, the processor, via communication interface 38, monitors communication traffic exchanged between network 34 and various Internet Protocol (IP) addresses. Hence, the processor may monitor the communication exchanged with device 24, along with a large number of other devices. In response to the monitoring, the processor may identify the IP address used by the owner of a particular cryptocurrency address of interest, referred to herein as the UOI. Subsequently, the identified IP address may be used to identify the UOI.

Typically, to facilitate monitoring the communication traffic, system 20 additionally comprises at least one network tap 40. Tap 40 copies each packet exchanged with any of the monitored IP addresses, and passes the copy, via communication interface 38, to processor 36. Tap 40 may be situated, for example, between the IP addresses and any ISPs that service the IP addresses.

System 20 may further comprise a computer monitor, a microphone, a speaker, and/or any other suitable hardware or software elements configured to facilitate interaction of a user with the system. For example, processor 36 may generate an alphanumeric output by displaying this output on a computer monitor belonging to the system.

In general, processor 36 may be embodied as a single processor, or as a cooperatively networked or clustered set of processors. Such a cooperatively networked or clustered set of processors may belong, at least partly, to a cloud computing service.

In some embodiments, the functionality of processor 36, as described herein, is implemented solely in hardware, e.g., using one or more Application-Specific Integrated Circuits (ASICs) or Field-Programmable Gate Arrays (FPGAs). In other embodiments, the functionality of processor 36 is implemented at least partly in software. For example, in some embodiments, processor 36 is embodied as a programmed digital computing device comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Identifying an IP Address of Interest

Figure 2:
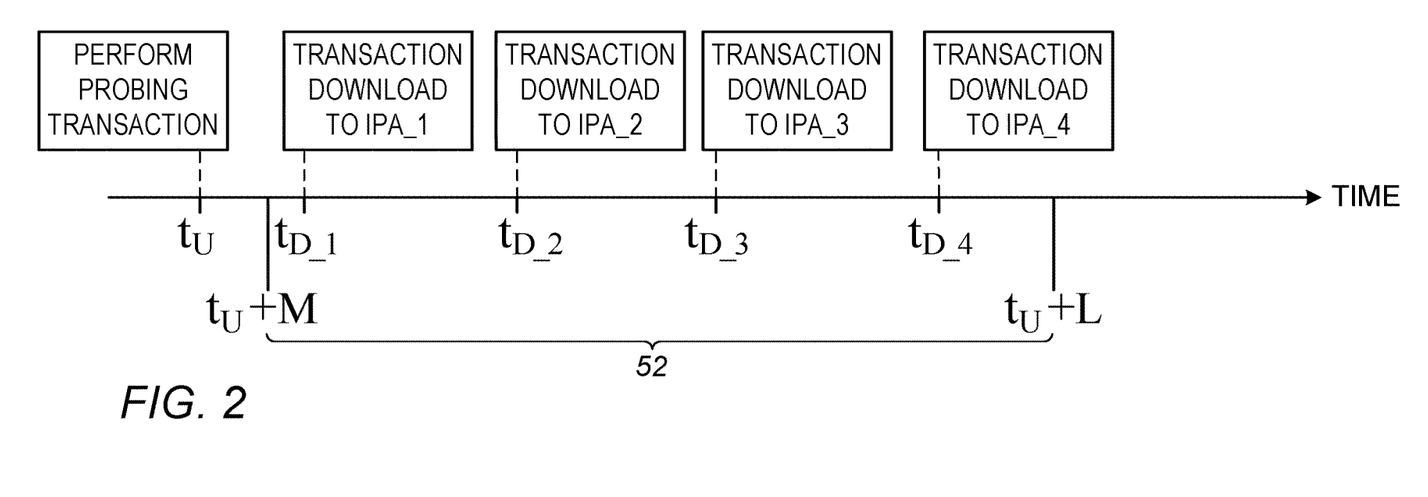
FIG. 2 is a schematic illustration of a technique for identifying an IP address associated with a cryptocurrency address of interest, in accordance with some embodiments of the present disclosure.

Reference is now made to FIG. 2, which is a schematic illustration of a technique for identifying an IP address associated with a cryptocurrency address of interest, in accordance with some embodiments of the present disclosure.

As described above in the Overview and with reference to FIG. 1, given a cryptocurrency address of interest, processor 36 (FIG. 1) discovers the IP address, referred to herein as the "IP address of interest," associated with this cryptocurrency address by virtue of being used by a device operating a node to which the cryptocurrency address belongs. To perform this discovery, the processor performs one or more probing transactions, in which respective amounts of the cryptocurrency are transferred to one or more cryptocurrency addresses, respectively. The processor further ascertains, by monitoring the communication traffic exchanged with various IP addresses (as described above with reference to FIG. 1), that at least one of the probing transactions was downloaded to a particular one of the IP addresses. In response thereto, the processor generates an output, such as an alphanumeric textual output, indicating an association between the cryptocurrency address of interest and the particular IP address.

Typically, the process of discovering the associated IP address begins with an initial probing transaction specifying the cryptocurrency address of interest. The processor performs the initial probing transaction by uploading a sequence of one or more packets specifying the probing transaction. Subsequently, the processor identifies any downloaded sequences of packets, referred to herein as "candidate corresponding downloads," known to specify the probing transaction or deemed to have a significant likelihood of specifying the probing transaction. The respective IP addresses to which these sequences are downloaded may then be identified as candidate associated IP addresses.

For example, the processor may identify an unencrypted download of the probing transaction performed by a partial node. In response thereto, the processor may identify the IP address to which the unencrypted download was performed as a candidate associated IP address.

Alternatively or additionally, the processor may identify a downloaded sequence of encrypted packets deemed to have a significant likelihood of specifying the probing transaction. In response thereto, the processor may identify the IP address to which the encrypted download was performed as a candidate associated IP address.

Various criteria may be used to ascertain whether an encrypted download has a significant likelihood of specifying the probing transaction. For example, the processor may require that the download be classified as pertaining to a cryptocurrency transaction, as described below with reference to FIG. 4. Alternatively or additionally, the processor may require that $t_D - t_U$, where $t_D$ is the time at which the encrypted sequence of packets was downloaded and $t_U$ is the time at which the transaction was uploaded, be within a predefined range [M, L]. In other words, the processor may require that any encrypted candidate corresponding download occur within a time window 52 beginning at $t_U + M$ and ending at $t_U + L$.

To define the aforementioned range, the processor may perform multiple transfers of cryptocurrency to one or more cryptocurrency addresses, each of which may belong to the processor or to another entity in communication with the processor. The processor may further record the delay $\Delta T$ between $t_U$ and $t_D$. Subsequently, based on the distribution of $\Delta T$, the processor may set the limits M and L of the range. For example, the processor may set M and L such that a given percentage of the $\Delta T$ values, such as 98% or 99% of the $\Delta T$ values, are between M and L. Alternatively, the processor may set M to be slightly less than the smallest value of $\Delta T$, and L to be slightly greater than the largest value of $\Delta T$.

Typically, $\Delta T$ depends on the level of congestion in the network, which depends, inter alia, on the time of day. Hence, in some embodiments, the processor performs the aforementioned procedure for multiple different time slots. Thus, for example, the processor may obtain a first range [M1, L1] for normal business hours, and another range [M2, L2], where M2<M1 and L2<L1, for other times of day. Subsequently, when identifying candidate corresponding downloads for a probing transaction, the processor uses the range that applies to the time of day at which the probing transaction was performed.

Alternatively or additionally, $\Delta T$ may depend on the service used to perform the download. Hence, in some embodiments, the processor performs the aforementioned procedure for multiple different services, such that the processor may obtain different respective ranges for the services. Subsequently, the processor may identify the service that was used to perform a particular download, as further described below with reference to FIG. 4. The processor may then select the range corresponding to the identified service.

Alternatively or additionally to requiring that $t_D-t_U$ be within the predefined range, the processor may require that the size $s_D$ of (i.e., the number of bytes in) the encrypted downloaded sequence, or of a portion of the sequence that appears to specify a transaction, correspond to the size $s_U$ of the uploaded sequence. The portion of the sequence that appears to specify the transaction may include, for example, each packet in the sequence having a size greater than a predefined threshold.

Typically, to ascertain whether the two sizes correspond to one another, the processor applies a predefined function $f(x)$, which represents the dependency of the download size on the upload size, to $s_U$, and then ascertains whether the difference between $f(s_U)$ and $s_D$ is within a predefined range. (Equivalently, the processor may ascertain whether the difference between $f'(s_D)$ and $s_U$ is within a predefined range, where $f'(x)$ is the inverse of $f(x)$.) If yes, the two sizes are deemed to correspond to one another.

Typically, $f(x)$ varies with the service used to perform the download. Thus, for example, the processor may use one function $f_1(x)$ for one service, and another function $f_2(x)$ for another service.

To learn $f(x)$ for a particular service, the processor may perform one or more test transactions via the service. (These transactions may be identical to those used to learn the time range [M, L], i.e., the same transactions may be used to learn both the time range and $f(x)$.) For each of these transactions, the processor may obtain a pair of numbers—the size x of the uploaded transaction, and the size y of the downloaded transaction. Subsequently, based on the (x,y) values, the processor may construct a lookup table representing $f(x)$. Alternatively, under the assumption that $f(x)$ is linear, the processor may obtain an explicit formula for $f(x)$ by performing a linear regression on the (x,y) values. The processor may further obtain the aforementioned range for $f(s_U)-s_D$ from the error in the regression.

For example, by transferring some cryptocurrency via a particular service, the processor may learn the function $f(x)=a*x+b$. The processor may further learn that y, the actual size of the downloaded transaction, may differ from $f(x)$ by up to $\pm c$. Subsequently, to ascertain whether a download having a size $s_D$, performed via the service, is a candidate corresponding download for a probing transaction having an upload size $s_U$, the processor may ascertain whether $f(s_U)-s_D$ is in the range $[-c, c]$.

By way of example, FIG. 2 shows four encrypted transaction downloads performed by respective devices using the IP addresses IPA_1, IPA_2, IPA_3, and IPA_4, respectively. These downloads occur at respective times $t_{D\_1}$, $t_{D\_2}$, $t_{D\_3}$, and $t_{D\_4}$, respectively, each of which is within window 52. Given this scenario, and assuming that the size of each download corresponds to that of the probing transaction, the processor may identify each of these downloads as a candidate corresponding download. Hence, each of the aforementioned IP addresses may be identified as candidate associated IP addresses.

In general, each "false" candidate corresponding download, which does not specify the probing transaction and/or was not performed by the device of the UOI, is either (i) a download of a different, similarly-sized transaction that was coincidentally performed at around the same time as the probing transaction, or (ii) a download of the probing transaction performed by a partial node that does not belong to the UOI. Typically, various techniques are employed so as to reduce the number of false candidate corresponding downloads obtained for each probing transaction.

Per one such technique, the processer inflates the size of each probing transaction, so as to reduce the number of false candidate corresponding downloads of the first type. In other words, by inflating the size of the probing transaction, the processor renders it less probable that a similarly-sized encrypted transaction will be coincidentally performed at the same time as the probing transaction. To inflate the size of the probing transaction, the processor may include at least two inputs and/or at least three outputs in the probing transaction. Alternatively or additionally, the processor may include, in the uploaded packet sequence that specifies the transaction, at least five, such as at least 10, bytes unrelated to any of the probing transactions. In some embodiments, the unrelated bytes are randomly generated.

Alternatively or additionally, the processor may ascertain that the UOI uses an external node that uses a particular service, such as Mycellium™ or Coinbase™ (or a particular class of such services), to access the cryptocurrency network. Subsequently, after performing a probing transaction, the processor may identify those downloads performed via the particular service (or from a service belonging to the particular class of services), as further described below with reference to FIG. 4. Each of the identified downloads may then be designated as a candidate corresponding download, provided that the download satisfies any other relevant criteria, such as the size and timing requirements described above. In contrast, other downloads, which were not performed via the particular service, may not be designated as candidate corresponding downloads. The processor may thus reduce the number of false candidate corresponding downloads of both types.

To ascertain the particular service used by the UOI's external node, the processor may (e.g., by implementing the functionality of a full node) download at least one transaction in which cryptocurrency is transferred from the cryptocurrency address of interest. The processor may then identify a feature of the transaction indicating the service via which the transaction was performed. For example, the processor may identify indicative information specified in the transaction, or an indicative omission of information from the transaction.

As a specific example, different blockchain services may apply different minimum transaction fees, and/or use different types of identifiers for the participants in the transaction. Hence, the processor may identify the service based on a transaction fee or a type of identifier specified in the transaction.

Typically, the processor excludes, from the set of candidate corresponding downloads, downloads performed by full nodes. Each IP address used by a full node may be identified, for example, in response to the number of transactions downloaded to the IP address within a given period of time exceeding a predefined threshold.

Even if the above-described techniques for reducing the number of false candidate corresponding downloads are employed—and certainly if these techniques are not employed—the number of candidate corresponding downloads may be greater than one, as in the case illustrated in FIG. 2. Hence, following the initial probing transaction, the processor may perform one or more subsequent probing transactions, until only a single candidate associated IP address remains.

For example, the processor may eliminate those of the candidate associated IP addresses to which false candidate corresponding downloads of the first type were performed, by performing one or more additional transfers to the cryptocurrency address of interest. In particular, the processor may eliminate each of the candidate associated IP addresses to which a candidate corresponding download was not performed for at least one of the additional transfers.

For example, in the case shown in FIG. 2, the processor may perform a second probing transaction in which some of the cryptocurrency is transferred to the cryptocurrency address of interest. The processor may then observe candidate corresponding transaction downloads to IPA_1 and IPA_2, but not to IPA_3 or IPA_4. In response thereto, IPA_3 and IPA_4 may be eliminated from candidacy.

Alternatively or additionally, following the initial probing transaction to the cryptocurrency address of interest, the processor may, by inspecting the blockchain, identify any other transactions (aside from the probing transaction) performed within the time range $[t_D-M, t_D-L]$ for any of the candidate downloads. The processor may further identify the respective destination cryptocurrency addresses of these transactions. Subsequently, the processor may iterate through these destination cryptocurrency addresses, performing, for each destination address, one or more probing transactions to the address (or to a related address, as described below). The processor may further ascertain that one of these probing transactions was downloaded to one of the candidate associated IP addresses, such that the candidate is actually associated with the destination address, rather than the cryptocurrency address of interest.

For example, in the case shown in FIG. 2, the processor may perform one or more additional probing transactions to a first destination cryptocurrency address identified in the blockchain. The processor may thus ascertain that the first destination address is associated with IPA_3. In response thereto, the processor may eliminate IPA_3 from candidacy. Subsequently, the processor may perform one or more additional probing transactions to a second destination cryptocurrency address, and thus ascertain that the second destination address is associated with IPA_4. In response thereto, the processor may eliminate IPA_4 from candidacy.

Alternatively or additionally, the processor may perform one or more additional probing transactions in which some of the cryptocurrency is transferred to another cryptocurrency address, referred to hereinbelow as a "related address," belonging to the same wallet as does the cryptocurrency address of interest. The processor may then eliminate, from candidacy, any IP address at which a candidate corresponding download for the related address was not performed. This technique may be particularly helpful in eliminating candidate associated IP addresses to which false candidate corresponding downloads of the second type were performed, given that it is unlikely for the same partial node not belonging to the UOI to download transactions for both the cryptocurrency address of interest and the related address. (In some embodiments, even the initial probing transaction specifies a related address, rather than the cryptocurrency address of interest.)

To identify groups, or "clusters," of related cryptocurrency addresses, the processor may use any suitable clustering techniques known in the art, such as any of the techniques described in Ermilov et al., "Automatic bitcoin address clustering," Machine Learning and Applications (ICMLA), 2017 16th IEEE International Conference on IEEE, 2017, which is incorporated herein by reference. For example, in response to observing a transaction in which two addresses appear together as inputs, the processor may cluster the two addresses with one another.

In some embodiments, the processor first eliminates candidate associated IP addresses to which false corresponding downloads of the first type were performed, by performing one or more additional transfers to the cryptocurrency address of interest as described above. Subsequently, if a candidate associated IP address used by a partial node remains together with at least one other candidate associated IP address, the processor may eliminate the false candidates by performing at least one additional transfer to a related cryptocurrency address.

In other embodiments, in response to identifying multiple candidates, the processor transfers some cryptocurrency to a related address without first performing additional transfers to the cryptocurrency address of interest. The processor may thus eliminate each candidate associated IP address to which either type of false candidate corresponding download was performed.

In some cases, even using the techniques described above, a plurality of candidate associated IP addresses may remain. In such cases, the processor may output the multiple candidates, optionally with respective likelihoods of correspondence to the cryptocurrency address of interest. Alternatively or additionally, the processor may wait a predefined period of time (e.g., 1-7 days), and then perform one or more additional probing transactions to the cryptocurrency address of interest. Given that a partial node may sometimes change the list of addresses for which transactions are downloaded, this technique may help eliminate false candidate associated IP addresses used by partial nodes.

Alternative Techniques

Figure 3:
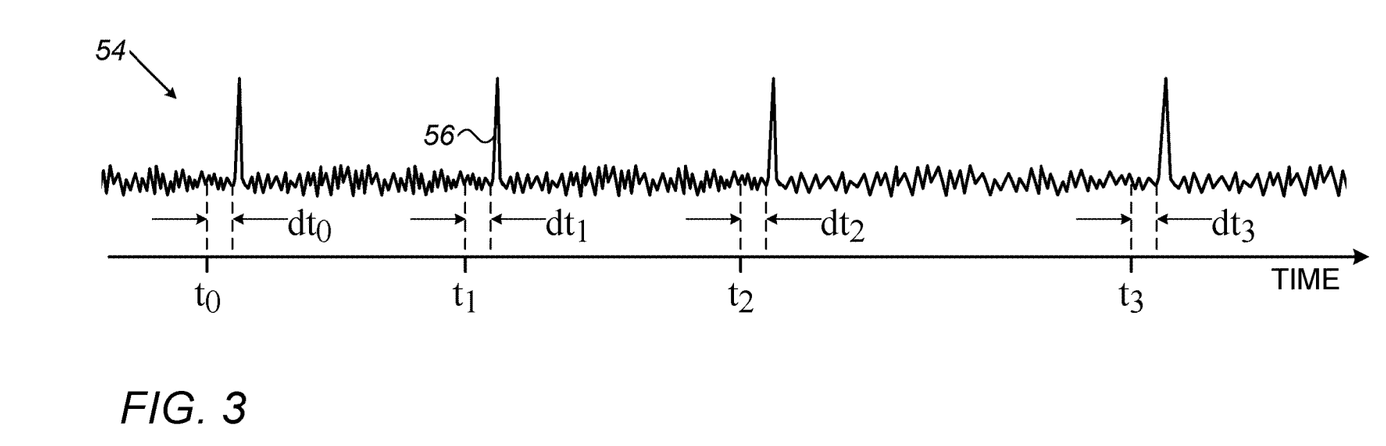
FIG. 3 is a schematic illustration of an alternative technique for identifying an IP address associated with a cryptocurrency address of interest, in accordance with some embodiments of the present disclosure.

Reference is now made to FIG. 3, which is a schematic illustration of an alternative technique for identifying an IP address associated with a cryptocurrency address of interest, in accordance with some embodiments of the present disclosure.

In some cases—e.g., cases in which the UOI's device uses a virtual private network (VPN) or The Onion Router (Tor)—all communication with the UOI's device belongs to a single Transmission Control Protocol (TCP) or User Datagram Protocol (UDP) flow. In such cases, the techniques described above may fail to identify the IP address used by the UOI's device, particularly due to the difficulty in classifying the encrypted traffic exchanged with the UOI's device.

Hence, in the event that the techniques described above fail to identify the IP address of interest, the processor may perform the alternative technique illustrated in FIG. 3. Per this technique, the processor performs one or more probing transactions at each time in a sequence of transaction times. (The transaction times may be periodically-spaced or irregularly-spaced.) Each group of probing transactions includes one or more transfers to the cryptocurrency address of interest or to a related address, and includes a relatively large volume of data. For example, at each of the transaction times, the processor may upload multiple (e.g., between three and ten) probing transactions, and/or the processor may inflate the size of each of the probing transactions, as described above with reference to FIG. 2.

Subsequently, the processor may identify multiple spikes 56 in download activity at one of the monitored IP addresses. The processor may further ascertain that each of the respective differences between the "spike times" at which spikes occur and the transaction times is within a predefined range, which may be set in response to the distribution of ΔT for downloads performed using a VPN or Tor.

For example, FIG. 3 shows probing transactions performed at times $t_0$, $t_1$, $t_2$, and $t_3$. In addition, FIG. 3 shows a signal 54 representing the level of download activity at a particular monitored IP address during the time over which the probing transactions are performed. (Signal 54 may be quantified in units of downloaded bytes per second, for example.) Given signal 54, the processor may identify multiple spikes 56 in the signal, and may further calculate the respective differences $dt_0$, $dt_1$, $dt_2$, and $dt_3$ between the times at which the probing transactions were performed and the times at which the spikes occurred. (The time of occurrence of each spike may be identified in response to the derivative of signal 54 exceeding a predefined threshold, and/or in response to any other suitable criteria.) In response to ascertaining that each of these differences is within the predefined range, the processor may identify the monitored IP address as a candidate associated IP address.

Alternatively or additionally, the processor may identify the monitored IP address as a candidate associated IP address in response to performing any other technique by which the temporal pattern of download activity indicated by signal 54 is matched to the temporal pattern of the probing transactions. Examples of such techniques are described in U.S. Pat. No. 9,641,444 to Altman, whose disclosure is incorporated herein by reference. For example, the processor may compare the intervals between successive probing transactions to the intervals between successive spikes.

If the above technique also fails to identify the IP address of interest, it may be assumed that the IP address of interest is outside the coverage of the probing system, that the cryptocurrency address of interest belongs to a full node, or that, while one or more of the probing transactions were performed, the device used by the UOI was offline or was not running the relevant cryptocurrency application.

Classifying the Encrypted Traffic

As described above in the Overview and with reference to FIG. 1, the traffic exchanged between an external node and the cryptocurrency service used by the node is typically encrypted. Hence, to facilitate identifying candidate corresponding downloads for any particular probing transaction, the processor may need to classify any encrypted traffic downloaded to the monitored IP addresses. In this regard, reference is now made to FIG. 4, which is a schematic illustration of a technique for classifying encrypted traffic, in accordance with some embodiments of the present disclosure.

Typically, subsequently to receiving an encrypted packet (e.g., from tap 40 (FIG. 1)), the processor associates the packet with the TCP or UDP flow 44 to which the packet belongs. Typically, to perform this association, the processor refers to the IP 5-tuple that is specified in the unencrypted header of each packet. That is, packets having the same 5-tuple, or respective 5-tuples that differ from each other only with respect to an interchanging of "source" and "destination," are associated with each other in a single flow. (In some embodiments, to conserve computational resources, only packets received within time window 52 (FIG. 2) are processed, while other packets are ignored.)

Figure 4:
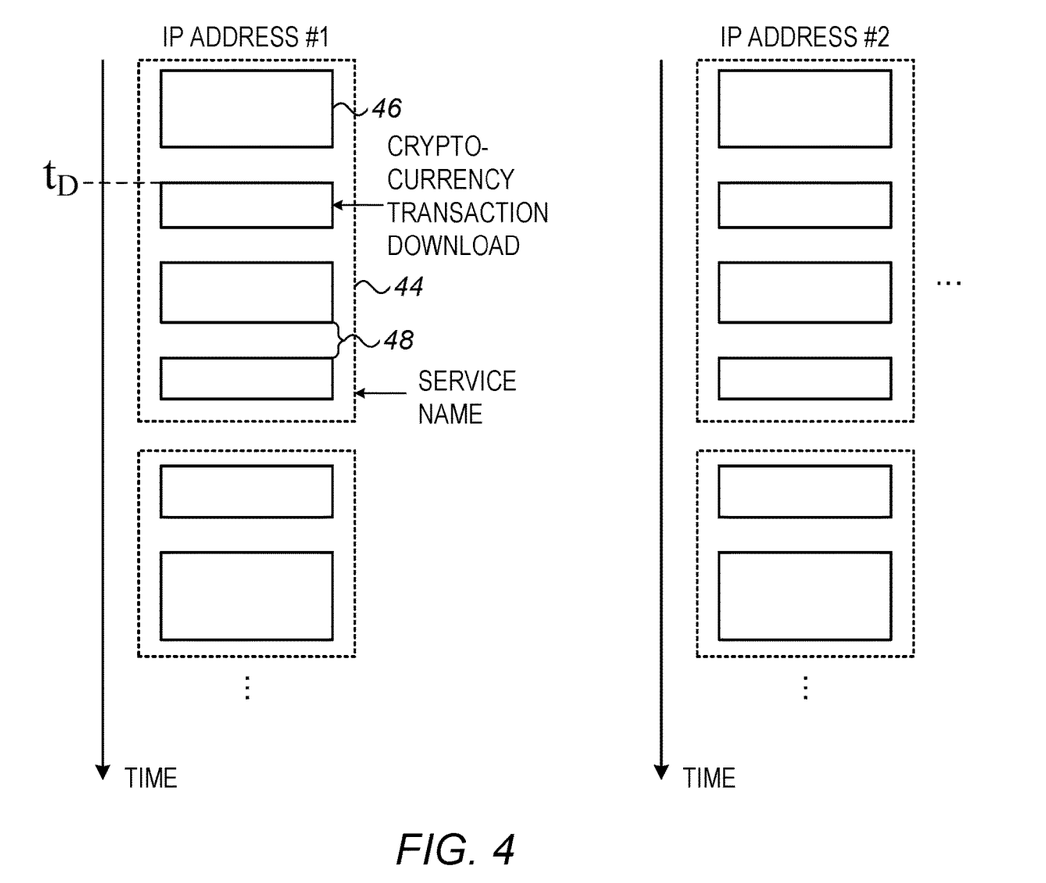
FIG. 4 is a schematic illustration of a technique for classifying encrypted traffic, in accordance with some embodiments of the present disclosure.

The processor further groups the flows by the IP addresses specified in the aforementioned 5-tuples. The processor may thus obtain, as illustrated in FIG. 4, multiple groups of one or more flows, the groups being associated with different respective IP addresses. (It is noted that, notwithstanding the simplified scenario depicted in FIG. 4 in which the flows are sequential, an IP address may participate in multiple flows simultaneously.)

For at least some of the flows, the processor may further identify a cryptocurrency service with which the flow was exchanged. For example, one of the IP addresses specified in the 5-tuple may be known a priori to be used by a particular cryptocurrency service. Alternatively, the processor may identify the service based on a Domain Name System (DNS) request originating from the monitored IP address and occurring immediately prior to the flow. Alternatively or additionally, other fields contained in the flow, such as a port number or a Transport Layer Security (TLS) header item (e.g., a Common Name Identifier) may be used to identify the service. As illustrated in FIG. 4, the processor may label the flow with the name of the service. In the event that the cryptocurrency address of interest is known to use a different service, the flow may be ignored; otherwise, the flow may be processed as described below.

Subsequently to grouping the flows and, optionally, identifying a cryptocurrency service for one or more of the flows, the processor, without decrypting the flows, may identify one or more cryptocurrency transaction downloads specified in the flows. In other words, the processor may identify, in the flows, one or more downloaded sequences of one or more packets specifying details of respective cryptocurrency transactions.

For example, the processor may first separate each flow into a sequence of blocks 46 of packets, based on the quiet time 48 between successive blocks. In other words, successive packets separated by more than a threshold duration of quiet time 48 may be assigned to different respective blocks. Each block may include any number of uploaded packets and/or any number of downloaded packets. Subsequently, the processor may identify a block in the flow that corresponds to a cryptocurrency transaction download, by virtue of including a downloaded sequence of one or more packets specifying details of the transaction. In response thereto, as illustrated in FIG. 4, the processor may label the block as corresponding to a cryptocurrency transaction download.

In general, the identification of cryptocurrency transaction downloads may be based on any suitable features of the blocks. Examples of such features are (i) the amount of time between the receipt of successive packets in the block, (ii) the absolute sizes of the packets, or the sizes of the packets relative to each other, and (iii) the respective directionalities of the packets, i.e., whether each packet was uploaded or downloaded. Another example is the ratio of the number, or total size of, the uploaded packets to the number, or total size of, the downloaded packets.

Typically, to identify the transaction downloads, the processor uses a classifier configured to label each block with either a "transaction" label or an "other" label. Any suitable techniques may be used to train the classifier. For example, the classifier may be trained on a labeled training set including a large number of labeled encrypted blocks. Any suitable supervised learning algorithm, such as, for example, XGBoost or the Random Forest algorithm, may be used for this purpose.

Following or during the labeling of each transaction-download block, the processor may further identify the download time $t_D$ at which the download was performed. Typically, for any given packet, the latency between the user's device and tap 40 (FIG. 1) is negligible; hence, typically, the time at which one of the packets in the block—typically, the first downloaded packet in the block—was received by tap 40 (or by the processor) is designated as $t_D$.

In other embodiments, the processor uses a classifier that processes the flow as a stream of packets, rather than as a sequence of predefined blocks. The classifier—which may include, for example, a convolutional neural network (CNN) or a recursive neural network (RNN)—both identifies and labels the blocks that correspond to cryptocurrency transaction downloads. The identification and labeling of the blocks may be based on any suitable features of the packets in the flow, such as any of the features described above.

Example Algorithm

Figure 5:
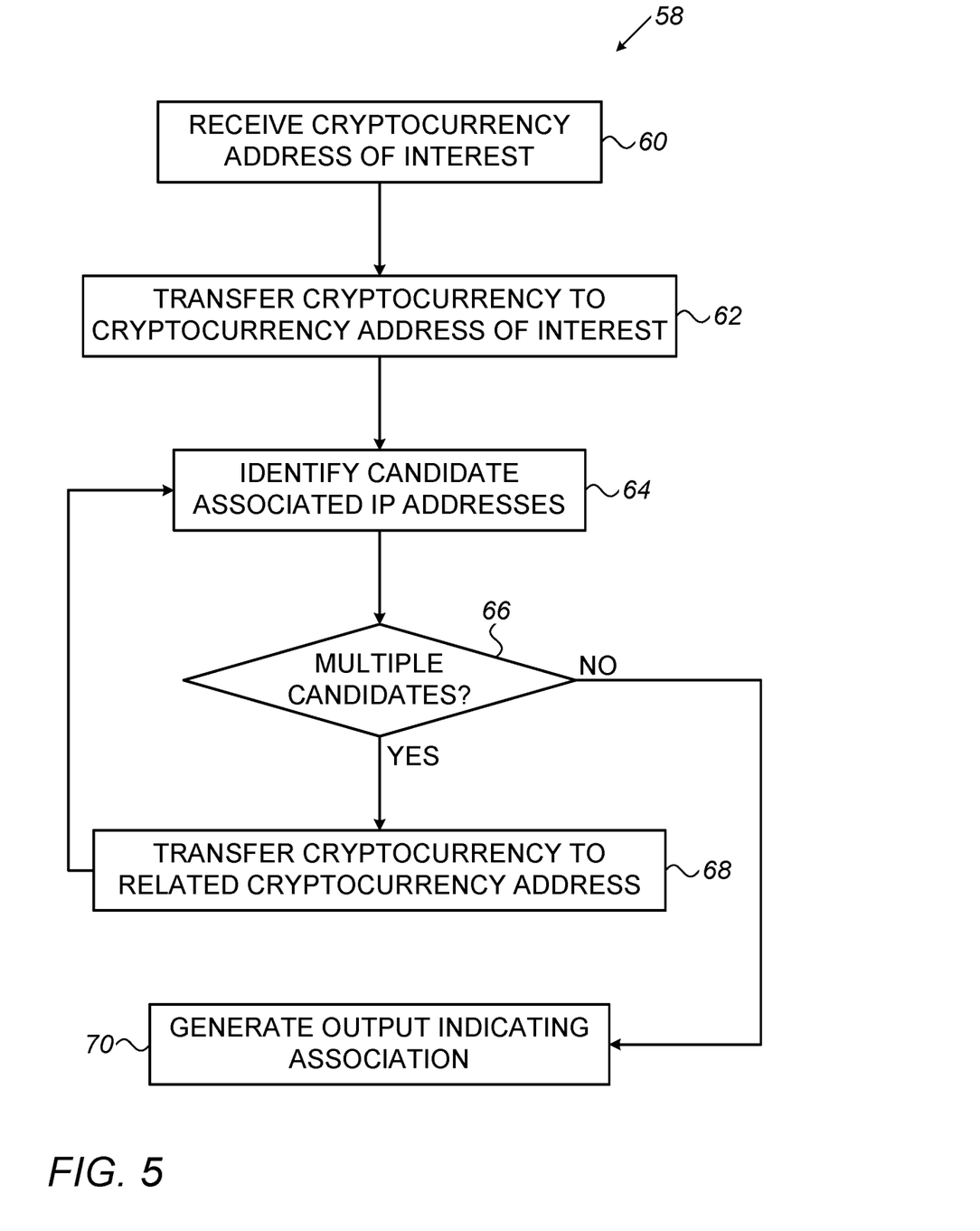
FIG. 5 is a flow diagram for an algorithm for identifying an IP address associated with a cryptocurrency address of interest, in accordance with some embodiments of the present disclosure.

Reference is now made to FIG. 5, which is a flow diagram for an algorithm 58 for identifying an IP address associated with a cryptocurrency address of interest, in accordance with some embodiments of the present disclosure.

Algorithm 58 begins at a receiving step 60, at which the processor receives a cryptocurrency address of interest. For example, a user of system 20 (FIG. 1) may input the cryptocurrency address to the processor using a keyboard or another input device.

In general, various reasons may account for a cryptocurrency address being of interest. For example, the cryptocurrency address may have been involved in a suspicious transaction. Alternatively, the cryptocurrency address may have been previously identified as being possibly associated with a particular IP address of interest. For example, the passive technique described in Israel Patent Application No. 265505, whose disclosure is incorporated herein by reference, may be used to obtain a shortlist of cryptocurrency addresses possibly associated with the IP address of interest. Subsequently to obtaining the shortlist, each of the cryptocurrency addresses in the shortlist may be treated, in turn, as the cryptocurrency address of interest, until corresponding downloads are observed at the IP address of interest. The cryptocurrency address for which the corresponding downloads are observed may then be identified as being associated with the IP address. (In this case, it may not be necessary to monitor multiple IP addresses as the probing transactions are performed, but rather, only the IP address of interest.)

Subsequently, at a transferring step 62, the processor performs an initial probing transaction, in which the processor transfers some of the cryptocurrency to the cryptocurrency address of interest. Following the transaction, the processor, by processing the monitored communication traffic, identifies any candidate associated IP addresses at an identifying step 64. Next, the processor checks, at a checking step 66, whether multiple candidate associated IP addresses were identified. If only a single candidate was identified, the processor, at an outputting step 70, generates an output indicating an association between the cryptocurrency address of interest and the single candidate. Otherwise, the processor, at another transferring step 68, performs another probing transaction, in which the processor transfers some of the cryptocurrency to a related cryptocurrency address.

Following transferring step 68, the processor again performs identifying step 64, thus potentially eliminating some of the previously-identified candidate associated IP addresses. The processor then checks, at checking step 66, whether multiple candidate associated IP addresses remain. If not, the processor performs outputting step 70. Otherwise, the processor may perform yet another probing transaction, in which the processor transfers some of the cryptocurrency to the same, or to another, related cryptocurrency address. This process may be repeated until only a single candidate remains.

In some embodiments, subsequently to identifying one or more candidate associated IP addresses, the processor, prior to performing each additional probing transaction, verifies that communication traffic is being exchanged with each of the candidates. If communication traffic is not observed for one or more of the candidates, the processor may refrain from performing the transaction. Thus, the processor may reduce the likelihood of a probing transaction being performed while the UOI's device is offline. Alternatively, the processor may perform the probing transaction even if one or more of the candidate associated IP addresses are inactive, but may refrain from eliminating these IP addresses from candidacy.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computer software product comprising a tangible non-transitory computer-readable medium in which program instructions are stored, which instructions, when read by a processor, cause the processor to:
    perform one or more probing transactions, in which respective amounts of a cryptocurrency are transferred to one or more cryptocurrency addresses, respectively, monitor communication traffic exchanged by the one or more cryptocurrency addresses with one or more Internet Protocol (IP) addresses, ascertain, based on monitored communication traffic, that at least one of the probing transactions was downloaded to a particular one IP address of the one or more IP addresses by at least one of the following:
   computing an expected download size of the at least one of the one or more probing transactions, ascertaining that a difference between (i) a download size of a sequence of one or more encrypted packets downloaded to the particular one of the IP addresses and (ii) the expected download size, is within a predefined range, and in response to ascertaining that the difference is within the predefined range, ascertaining that the at least one of the one or more probing transactions was downloaded to the particular one of the IP addresses by virtue of the sequence specifying the at least one of the one or more probing transactions;
   using an encrypted-packet classifier, ascertaining that ft the sequence of the one or more encrypted packets downloaded to the particular one of the IP addresses specifies a downloaded transaction in the cryptocurrency, and in response to ascertaining that the sequence specifies the downloaded transaction, ascertaining that the at least one of the one or more probing transactions was downloaded to the particular one of the IP addresses by virtue of the downloaded transaction being the at least one of the one or more probing transactions; or
   subsequently to performing the at least one of the probing transactions, ascertaining that a first downloaded transaction in the cryptocurrency was downloaded to the particular one of the IP addresses and a second downloaded transaction in the cryptocurrency was downloaded to another IP addresses, ascertaining that another one of the probing transactions, in which some of the cryptocurrency is transferred to one of the cryptocurrency addresses that is different from the one or more cryptocurrency addresses of interest, was downloaded to the another IP addresses, and in response to ascertaining that the other one of the probing transactions was downloaded to the another IP addresses, ascertaining that the at least one of the probing transactions was downloaded to the particular one of the IP addresses, by virtue of the first downloaded transactions being the at least one of the probing transactions, and
generate, in response to the ascertaining, an output indicating an association between a cryptocurrency address of interest of the one or more cryptocurrency addresses and the particular one IP address of the one or more IP addresses.

2. A system, comprising:
a communication interface; and
a processor, configured to:
perform one or more probing transactions, in which respective amounts of a cryptocurrency are transferred to one or more cryptocurrency addresses of interest,
monitor, via the communication interface, communication traffic exchanged by the one or more cryptocurrency addresses of interest with one or more Internet Protocol (IP) addresses,
ascertain, based on monitored communication traffic, that at least one of the one or more probing transactions was downloaded to a particular one IP address of the one or more IP addresses by at least one of the following:
   computing an expected download size of the at least one of the one or more probing transactions, ascertaining that a difference between (i) a download size of a sequence of one or more encrypted packets downloaded to the particular one of the IP addresses and (ii) the expected download size, is within a predefined range, and in response to ascertaining that the difference is within the predefined range, ascertaining that the at least one of the one or more probing transactions was downloaded to the particular one of the IP addresses by virtue of the sequence specifying the at least one of the one or more probing transactions;
   using an encrypted-packet classifier, ascertaining that the sequence of the one or more encrypted packets downloaded to the particular one of the IP addresses specifies a downloaded transaction in the cryptocurrency, and in response to ascertaining that the sequence specifies the downloaded transaction, ascertaining that the at least one of the one or more probing transactions was downloaded to the particular one of the IP addresses by virtue of the downloaded transaction being the at least one of the one or more probing transactions; or
   subsequently to performing the at least one of the probing transactions, ascertaining that a first downloaded transaction in the cryptocurrency was downloaded to the particular one of the IP addresses and a second downloaded transaction in the cryptocurrency was downloaded to another IP address, ascertaining that another one of the probing transactions, in which some of the cryptocurrency is transferred to one of the cryptocurrency addresses that is different from the one or more cryptocurrency addresses of interest, was downloaded to the another IP addresses, and in response to ascertaining that the other one of the probing transactions was downloaded to the another IP addresses, ascertaining that the at least one of the probing transactions was downloaded to the particular one of the IP addresses, by virtue of the first downloaded transactions being the at least one of the probing transactions, and
generate, in response to the ascertaining, an output indicating an association between a cryptocurrency address of interest of the one or more cryptocurrency addresses and the particular one IP address of the one or more IP addresses.

3. The system according to claim 2,
wherein the processor is configured to perform the one or more probing transactions by uploading an uploaded sequence specifying the one or more probing transactions, and
wherein the processor is configured to compute the expected download size by applying a linear function to an upload size of the uploaded sequence.

4. The system according to claim 2, wherein the processor is configured to perform the one or more probing transactions by uploading a plurality of uploaded sequences of one or more packets specifying a specific probing transaction, respectively, each of the uploaded sequences including bytes unrelated to any of the one or more probing transactions.

5. The system according to claim 1,
wherein the processor is configured to perform the one or more probing transactions by performing a respective one or more of the probing transactions at each time in a sequence of transaction times, and wherein the processor is configured to ascertain that the one or more probing transactions were downloaded to the particular one of the IP addresses by:

identifying multiple spikes in download activity at the particular one of the IP addresses at respective spike times, and ascertaining that each of respective differences between the spike times and the transaction times is within a predefined range.

6. A method, comprising:

performing one or more probing transactions, in which respective amounts of a cryptocurrency are transferred to one or more cryptocurrency addresses;

monitoring communication traffic exchanged by the one or more cryptocurrency addresses with one or more Internet Protocol (IP) addresses, ascertaining, based on monitored communication traffic, that at least one of the probing transactions was downloaded to a particular one IP address of the one or more IP addresses by at least one of the following:

computing an expected download size of the at least one of the one or more probing transactions, ascertaining that a difference between (i) a download size of a sequence of one or more encrypted packets downloaded to the particular one of the IP addresses and (ii) the expected download size, is within a predefined range, and in response to ascertaining that the difference is within the predefined range, ascertaining that the at least one of the one or more probing transactions was downloaded to the particular one of the IP addresses by virtue of the sequence specifying the at least one of the one or more probing transactions;

using an encrypted-packet classifier, ascertaining that the sequence of the one or more encrypted packets downloaded to the particular one of the IP addresses specifies a downloaded transaction in the cryptocurrency, and in response to ascertaining that the sequence specifies the downloaded transaction, ascertaining that the at least one of the one or more probing transactions was downloaded to the particular one of the IP addresses by virtue of the downloaded transaction being the at least one of the one or more probing transactions; or subsequently to performing the at least one of the probing transactions, ascertaining that a first downloaded transaction in the cryptocurrency was downloaded to the particular one of the IP addresses and a second downloaded transaction in the cryptocurrency was downloaded to another IP address, ascertaining that another one of the probing transactions, in which some of the cryptocurrency is transferred to one of the cryptocurrency addresses that is different from the one or more cryptocurrency addresses of interest, was downloaded to another IP addresses, and in response to ascertaining that the other one of the probing transactions was downloaded to another IP addresses, ascertaining that the at least one of the probing transactions was downloaded to the particular one of the IP addresses, by virtue of the first downloaded transactions being the at least one of the probing transactions, and generating, in response to the ascertaining, an output indicating an association between a cryptocurrency address of interest of the one or more cryptocurrency addresses and the particular one IP address of the one or more IP addresses.

7. The method according to claim 6, wherein the processor is configured to perform the one or more probing transactions by uploading an uploaded sequence specifying the one or more probing transactions, and wherein the processor is configured to compute the expected download size by applying a linear function to an upload size of the uploaded sequence.

8. The method according to claim 6, wherein the processor is configured to perform the one or more probing transactions by uploading a plurality of uploaded sequences of one or more packets specifying a specific probing transaction, respectively, each of the uploaded sequences including bytes unrelated to any of the one or more probing transactions.

9. The method according to claim 6, wherein the processor is configured to perform the one or more probing transactions by performing a respective one or more of the probing transactions at each time in a sequence of transaction times, and wherein the processor is configured to ascertain that the one or more probing transactions were downloaded to the particular one of the IP addresses by:

identifying multiple spikes in download activity at the particular one of the IP addresses at respective spike times, and ascertaining that each of respective differences between the spike times and the transaction times is within a predefined range.

* * * * *